United States Patent [19]
Wickham

[11] Patent Number: 5,297,356
[45] Date of Patent: Mar. 29, 1994

[54] BEVELLED FISHHOOK

[76] Inventor: Russell A. Wickham, 3818 Fairfield Ave., Fort Wayne, Ind. 46807

[21] Appl. No.: 971,408

[22] Filed: Nov. 4, 1992

[51] Int. Cl.⁵ .............................................. A01K 83/00
[52] U.S. Cl. .................................................... 43/43.16
[58] Field of Search ............................ 43/43.16, 44.82

[56] References Cited

U.S. PATENT DOCUMENTS

| | | | |
|---|---|---|---|
| D. 222,833 | 1/1972 | Fjuii | 43/43.16 |
| 1,430,626 | 10/1922 | Christensen | 43/43.16 |
| 2,164,807 | 7/1939 | Evans | 43/43.16 |
| 2,539,735 | 1/1951 | Forsyth | 43/43.16 |
| 4,819,366 | 4/1989 | Manno | 43/42.39 |
| 4,833,816 | 5/1989 | Sitton | 43/43.16 |
| 4,905,402 | 3/1990 | Clark | 43/43.16 |

FOREIGN PATENT DOCUMENTS

| | | | |
|---|---|---|---|
| 21260 | of 1904 | United Kingdom | 43/43.16 |
| 23079 | of 1908 | United Kingdom | 43/43.16 |
| 292372 | 6/1928 | United Kingdom | 43/43.16 |

Primary Examiner—Kurt C. Rowan
Attorney, Agent, or Firm—Baker & Daniels

[57] ABSTRACT

A fishhook for use with artificial bait is disclosed having a shank portion and a hook portion. The hook portion terminates in a point and includes a upper surface and a lower surface which includes a barb. The upper surface comprises a first bevelled surface and a second bevelled surface, wherein the bevelled surfaces intersect at an edge, which is collinear with the point. The shank portion may or may not include a lead weight attached thereto.

5 Claims, 2 Drawing Sheets

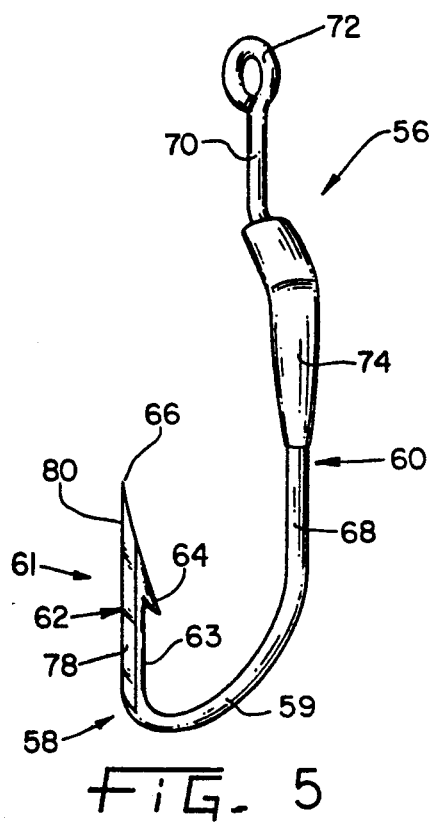
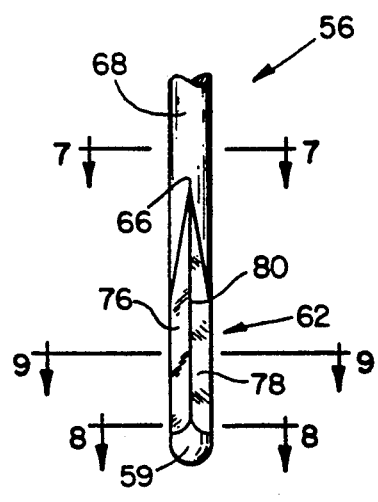
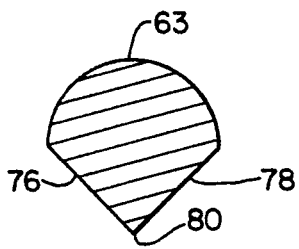
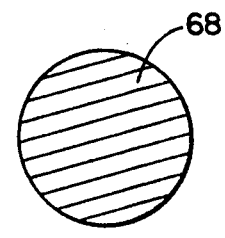
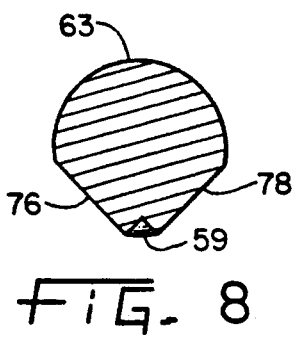
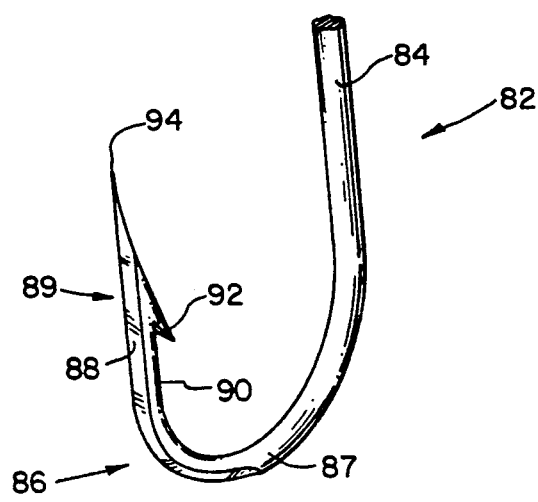

BEVELLED FISHHOOK

BACKGROUND OF THE INVENTION

The present invention relates generally to fishhooks and, more particularly, to fishhooks used in combination with artificial fishing lures.

A wide variety of fishhooks have been developed over the years in order to maximize a fisherman's chances of catching the most and largest fish. In particular, modifications have been made to both the barb as well as the shank of the hook. Despite the multitude of such modifications, they all have one common drawback. None of these designs provides a fishhook that quickly and consistently cuts through the artificial bait in order to more quickly set the hook in the jaw of the biting fish. It is desired to provide a fishhook that provides additional advantages over current fishhook designs.

SUMMARY OF THE INVENTION

Generally, the present invention provides a fishhook having a shank and a hook portion. The hook portion comprises a first surface having a barb and a second surface opposite the first surface. The second surface includes a first bevelled surface and a second bevelled surface, wherein the first and second surfaces intersect at an edge.

More specifically, the present invention, in one form thereof, comprises a fishhook having a shank including a hook portion at a first end of the shank and an eyelet at a second and opposite end of the shank. The hook portion terminates at a point and includes a first surface including a barb extending outwardly therefrom and a second surface opposite the first surface. The second surface comprises a first bevelled surface and a second bevelled surface which intersects the first bevelled surface at an edge that is collinear with the point. The shank may be a straight shank, a 45 offset shank, or a 90 offset shank. The shank may include a lead weight, if desired, in order to diminish the possibility of undesired objects, such as weeds or sunken objects, from being snagged by the fishhook, while adding weight to the bait. Preferably, the lead weight does not encompass the offset section of the shank or the eyelet.

An advantage of the fishhook of the present invention is that during the hook setting movement of the fisherman, the top bevelled surface cuts through the artificial lure faster, thereby exposing the point of the hook quicker and allowing for a quicker hook set.

Another advantage of the fishhook of the present invention is that less line pressure is required to pull the hook through the plastic lure, thereby decreasing the chance of line breakage.

Yet another advantage of the fishhook of the present invention is that the bevelled hook surface does not have to be pulled close to the surface of the plastic bait, thereby reducing initial bait damage.

Other advantages of the present invention will be apparent upon the following description.

BRIEF DESCRIPTION OF THE DRAWINGS

FIG. 5 is a perspective view of yet another alternative fishhook embodiment;

FIG. 6 is an enlarged fragmentary front view of the fishhook of FIG. 5;

FIG. 7 is an enlarged fragmentary sectional view of the fishhook of FIG. 6, taken along lines 7—7 in FIG. 6;

FIG. 8 is an enlarged fragmentary sectional view of the fishhook of FIG. 6, taken along line 8—8 in FIG. 6;

FIG. 9 is an enlarged fragmentary sectional view of the fishhook of FIG. 6, taken along line 9—9 in FIG. 6; and FIG. 10 is a fragmentary perspective view of still another alternative fishhook embodiment.

DETAILED DESCRIPTION OF THE INVENTION

Figure 1:
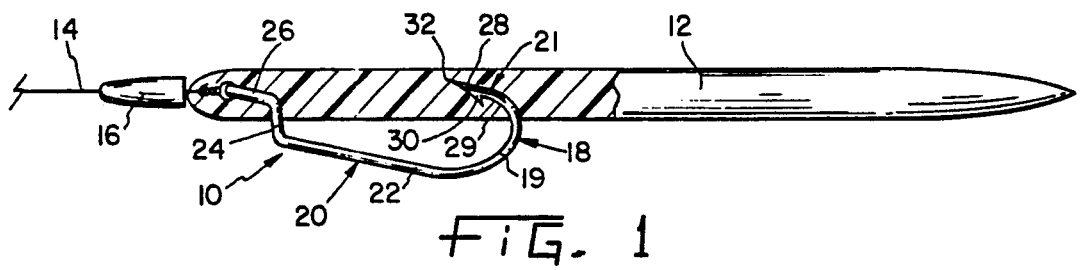
FIG. 1 is a side elevational view of a fishhook in accordance with the principles of the present invention, particularly showing the hook embedded in an artificial lure.

Referring to the drawings, and in particular to FIG. 1, there is shown a fishhook and lure arrangement in the form of a weighted, weedless arrangement. In particular, there is shown a fishhook 10 that is set within an artificial lure 12. The arrangement further includes a fishing line 14 including a bullet weight 16 that slides on line 14.

Fishhook 10 comprises a hook portion 18 and a shank 20 comprising a straight section 22, a shoulder section 24 and an offset section 26 that is offset about. Hook portion 18 comprises the curved portion 19 of the fishhook and the relatively straight end portion 21, which includes a top surface 28 and a bottom surface 29 including a barb 30. End portion 21 terminates in a point 32. Top surface 28 is bevelled to form an edge and will be discussed in further detail hereinafter.

Figure 2:
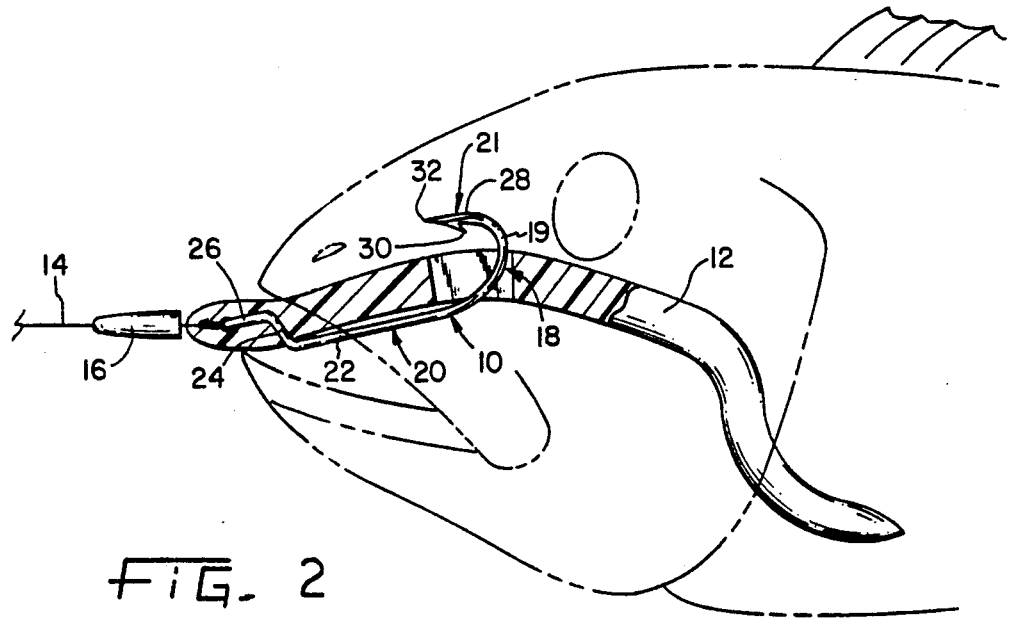
FIG. 2 is a view of the fishhook and lure arrangement of FIG. 1, particularly showing the hook in its position after initially cutting through the lure as a result of a fish engaging the lure.
Figure 3:
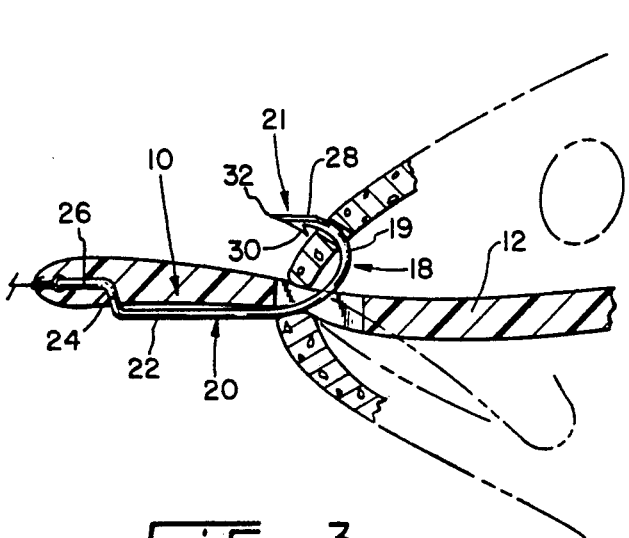
FIG. 3 is a view of the fishhook arrangement of FIGS. 1 and 2, particularly showing the hook set in the jaw of the fish.
Figure 4:
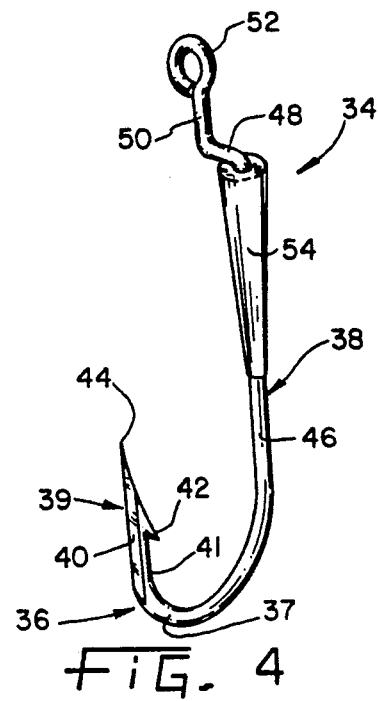
FIG. 4 is a perspective view of an alternative embodiment to the fishhook shown in FIGS. 1-3.

An alternative embodiment to fishhook 10 is fishhook 34, as shown in FIG. 4, which is essentially the same as fishhook 10 except that fishhook 34 includes a lead weight on the shank of the hook instead of the separate sinker shown in FIGS. 1-3. By eliminating the separate sinker, the possibility of the sinker snagging undesired objects, such as weeds or sunken objects is greatly reduced. Fishhook 34 comprises a hook portion 36 and an offset shank 38. Hook portion 36 comprises a curved portion 37 and a relatively straight portion 39 comprising a bevelled top surface 40, a bottom surface 41 including a barb 42 and terminating at a point 44. Shank 38 includes a straight section 46, a shoulder section 48 and an offset section 50 including an eyelet 52. A lead weight 54 is formed on straight section 46 of shank 38 and terminates where straight section 46 turns into shoulder section 48. Preferably, weight 54 does not extend to eyelet 52 to prevent damage to the bait that could otherwise occur due to the bait being in contact with and rubbing against weight 54.

Yet another alternative fishhook design is shown in FIG. 5 and comprises a fishhook 56 having a hook portion 58 and a shank 60. Again, hook portion 58 includes a curved section 59 and a relatively straight section 61. Section 61 includes a bevelled top surface 62, an opposite surface 63 including a barb 64 and terminates at a point 66. Shank 60 comprises a straight section 68, a 45° shoulder section (not shown) and an offset section 70 including an eyelet 72. A lead weight 74 is secured to both the straight section 68 and the shoulder section of shank 60 and terminates where the shoulder section of shank 60 turns into offset section 70.

Referring now to FIG. 6, the bevelled top surface 62 of fishhook 56 is shown in greater detail. Top surface 62 comprises bevelled surfaces 76 and 78 which intersect at an edge 80. Edge 80 functions as a cutting surface which shall be discussed hereinafter.

As shown in FIGS. 7-9, the transition of the fishhook to the bevelled surface is shown in greater detail. In FIG. 7, it is seen that section 68 of shank 60 is generally circular in cross section. Referring to FIG. 8, there is shown the transition in the surface of the hook from being circular in cross section to being bevelled. In particular, curved section 59 of hook portion 58 is generally circular in cross section. However, at the point of transition from curved section 59 to straight section 61, the top surface 62 becomes bevelled, forming bevelled surfaces 76 and 78, as shown. It is noted that surface 63 remains generally circular in cross section. FIG. 9 illustrates the contrast between the sharp cutting edge 80 formed by bevelled edges 76 and 78, and the opposite surface 63, which is round in cross section.

It is noted that prior art fishhooks, if taken through their cross sections at all points along their hook portions (with the exception of the barb), show a circular cross section, similar to that shown in FIG. 7, which is unable to positively slice through an artificial lure and quickly set in the jaw of a fish. However, with the novel arrangement of the present invention, such disadvantage is overcome by the formation of sharp cutting edge 80.

Although edge 80 is shown centered within top surface 62, it will be appreciated that either bevelled surface 76 or 78 may be greater in width than the other, thereby moving edge 80 selectively to either side of point 66. It is also appreciated that the bevelled surfaces of the other embodiments describe herein employ the bevelled edge shown in detail in FIGS. 6-9 for fishhook 56.

Referring now to FIG. 10, another embodiment is disclosed. In particular, fishhook 82 comprises a shank portion 84 and a hook portion 86. Hooked portion 86 again comprises a curved portion 87 and a relatively straight portion 89. Straight portion 89 comprises a top surface 88 that is bevelled as shown and a bottom surface 90 including a barb 92. Straight portion 89 terminates in point 94. Unlike the embodiments previously disclosed, bevelled surface 88 of fishhook 82 extends beyond the straight portion 89 and extends into curved portion 87. This extended bevelled surface area provides greater cutting surface area and may be incorporated into any of the fishhook designs shown hereinabove.

Returning now to FIGS. 1-3, the operation of the cutting action of fishhook 10 is shown. In FIG. 1, fishhook 10 is mounted in lure 12 such that hooked portion 18 is embedded within lure 12. Once a fish swallows lure 12 as shown in FIG. 2, hook 10 is rotated upwardly, causing bevelled surface 28 to positively slice through lure 12 and into the fish's jaw. As shown in FIG. 3, upon setting the hook within the fish, bevelled surface 28 slices through the jaw of the fish, and in some circumstances, helps permit the fishhook 10 to extend through the jaw of the fish.

It will be appreciated that the foregoing is presented by way of illustration only, and not by way of any limitation, and that various alternatives and modifications may be made to the illustrated embodiment without departing from the spirit and scope of the invention.

What is claimed is:

1. A fishhook comprising:
   a shank;
   a hook portion at a first end of said shank and an eyelet at a second and opposite end of said shank;
   said hook portion terminating in a point and comprising a generally straight section and a curved section, said straight section comprising a first surface including a barb extending outwardly therefrom and a second and opposite surface comprising a first bevelled surface and a second bevelled surface, said first and second bevelled surfaces intersecting at an edges, said first and second bevelled surfaces extending beyond said straight section and into said curved section but not beyond said curved section.

2. The fishhook of claim 1, wherein said edge is collinear with said point.

3. The fishhook of claim 1, wherein said shank includes a weight attached thereto.

4. The fishhook of claim 3, wherein said shank comprises a relatively straight section, a shoulder section, and an offset, section, wherein said weight is attached to one of said straight section only and said straight section and said shoulder section.

5. The fishhook of claim 1, wherein said shank includes a generally straight lower portion, a shoulder portion, and an upper portion that is offset from said lower portion, wherein a weight is attached to said lower portion, said weight being tapered and configured to be at least partially embedded within an artificial bait that is secured to the fishhook.

* * * * *